No. 738,239. Patented September 8, 1903.

UNITED STATES PATENT OFFICE.

ISAIAH L. ROBERTS, OF BROOKLYN, NEW YORK, ASSIGNOR TO THE ROBERTS BATTERY COMPANY, A CORPORATION OF NEW YORK.

PROCESS OF MAKING ZINC AND CHROMIUM HYDRATES.

SPECIFICATION forming part of Letters Patent No. 738,239, dated September 8, 1903.

Application filed October 1, 1902. Serial No. 125,518. (No specimens.)

*To all whom it may concern:*

Be it known that I, ISAIAH L. ROBERTS, a citizen of the United States, residing at the borough of Brooklyn, city of New York, county of Kings, State of New York, have invented a certain new and useful Process of Making Zinc and Chromium Hydrates, of which the following is a specification.

My process is especially useful in recovering hydrates from electric-battery solutions containing sulfates formed by electrolytic action, as in the case of an exhausted solution from a battery in which sulfuric acid and a bichromate were used. Heretofore the recovery of these hydrates has not been commercially practicable, owing to the costliness of the necessary reagents and the methods employed. My invention, however, enables one to obtain them easily and at comparatively slight cost by the use of cheap reagents not before known to have the capacity of causing such reactions as they here effect.

It has always been thought necessary in order to precipitate hydrates from solutions of salts to employ either gases, as ammonium, carbonic acid, &c., or solutions, as carbonates, hydrates, &c.; but I have discovered that insoluble carbonates and hydrates can cause this precipitation. For that purpose I have used the carbonates and hydrates of calcium and magnesium with the desired results.

In treating a mixed solution of zinc and chromium sulfates I first add enough calcium chlorid to the solution to convert the sulfates into chlorids. The sulfuric acid unites with the calcium and is precipitated as calcium sulfate, a compound which by proper heating may be converted into the valuable product plaster-of-paris. To the chlorids is then added a quantity of powdered calcium carbonate, the effect of which is to precipitate the chromium in the form of the hydrate. The latter is washed on the filter and the wash-water added to the zinc chlorid, which is not acted upon by the calcium carbonate. The costly pigment chrome-green may be obtained from the hydrate by heating the same. To the remaining solution, which contains zinc and calcium chlorid, is now added calcium hydrate. Zinc hydrate is thrown down and may be filtered out. By heating the latter product zinc-white may be obtained. The calcium hydrate used in the last step of my process becomes calcium chlorid by uniting with the chlorin of the zinc chlorid, so that when the last hydrate is separated there remains practically nothing but the calcium chlorid, which is the reagent used in the first step of my process. In exhausted battery solutions containing sodium or potassium sulphate, in addition to chromium and zinc sulfates, a larger quantity of calcium chlorid should be used in the first step, so as to convert all the sulfates into chlorids. The latter are then reduced to hydrates by the use of a carbonate and a hydrate, as before explained.

The process which I have described is obviously not limited in application to exhausted battery solutions, but may be employed with advantage in many other cases. For example, I may mention that it affords an inexpensive method of obtaining lead carbonate or white lead, since the action of the calcium carbonate upon a lead solution is to precipitate not the hydrate, but the carbonate.

Having now described my invention, what I claim is—

1. The herein-described process of obtaining zinc and chromium hydrates from a solution of their sulfates, which consists in adding calcium chlorid to the solution, adding to the resulting chlorids an insoluble carbonate to precipitate the hydrate of one of the metals, separating such precipitate, then adding calcium hydrate to the remaining chlorid to precipitate the other hydrate, as set forth.

2. The herein-described process of obtaining zinc and chromium hydrates from a solution of their sulfates, which consists in adding calcium chlorid to the solution, adding to the resulting chlorids calcium carbonate to precipitate chromium hydrate, separating such hydrate from the remaining chlorid, then adding calcium hydrate to precipitate zinc hydrate, as set forth.

ISAIAH L. ROBERTS.

Witnesses:
EDMUND TWEEDY,
S. S. DUNHAM.